Nov. 14, 1944.   H. D. GIFFEN   2,362,626
TENSIOMETER
Filed April 8, 1943

INVENTOR.
Harvey D. Giffen
BY
Fred Gerlach
atty.

Patented Nov. 14, 1944

2,362,626

UNITED STATES PATENT OFFICE 2,362,626

TENSIOMETER

Harvey D. Giffen, Pico, Calif., assignor to Consolidated Vultee Aircraft Corporation, San Diego, Calif., a corporation of Delaware Application April 8, 1943, Serial No. 482,259

13 Claims. (Cl. 73—144)

This invention relates to a cable tensiometer, and more particularly to an instrument of this character which is adapted for measuring loads in the flexible control cables of an airplane.

The general object of the invention is to provide a tensiometer wherein equal increments of load will give equal or greater indications as the load is increased.

Another object of the invention is to provide a new and improved instrument of simple construction that will operate with a high degree of accuracy.

A further object is to provide a new and improved tensionmeter capable of measuring loads in control cables while the cables are in operation.

Still another object of the invention is to provide a tensiometer adapted for measuring varying loads in flexible cables and including an indicating device which may be disposed and observed at a point remote from the cable under test.

More specifically, it is an object of the invention to provide a tensiometer designed to conveniently employ a pair of electric strain gauges for responding to changes of load, together with flexible conductors extending from such gauges to an indicating instrument located at a point remote from the tensiometer itself.

Other objects and advantages will appear from the following description taken in connection with the drawing, in which.

Figure 1:
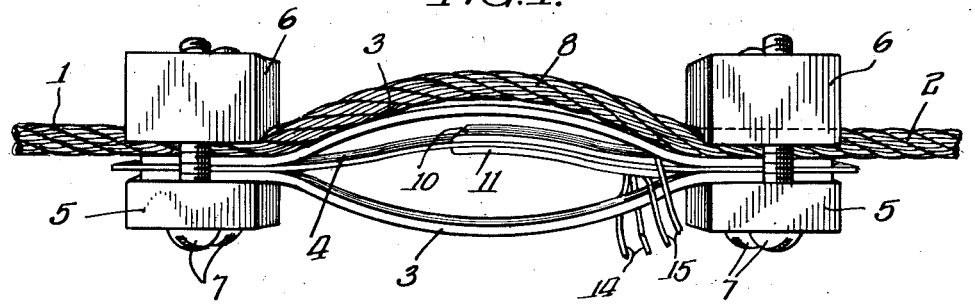
Fig. 1 is a perspective view of a tensiometer embodying this invention, showing it applied to a cable in position for use and with electric strain gauges attached.

While I have shown in the drawing and shall herein describe in detail a preferred form of the invention, it is to be understood that I do not intend to limit the invention to the specific form or application disclosed, but aim to cover all modifications and alternative constructions falling within the scope of the invention as expressed in the claims.

The illustrative embodiment of the invention shown in the drawing consists essentially of a deflectible unit in the form of a modified ellipse composed of a pair of spring metal strips secured together at their ends with a prime strip of somewhat less initial curvature secured between them. The end portions of the unit are provided with clamping means for gripping longitudinally spaced portions of a cable with the intermediate portion of the cable slack, so that the spring strips assume the load and are more or less flexed toward each other as the load increases. The corresponding lateral flexure of the prime strip is measured by suitable means to obtain indications of the loads to which the cable is subjected.

As shown in Fig. 1, the device is affixed to the longitudinally spaced portions 1 and 2 of a cable, and it includes a pair of curved steel spring members 3, 3 having their end portions clamped to the cable with their intermediate portions bowed away from a median plane denoted by the line X—X, and at opposite sides of this plane, respectively. A prime indicating strip 4, having an initial curvature which is somewhat less than that of the members 3, 3, is secured between them; it may be composed of any thin, flexible metal such as steel or brass. The ends of the steel springs 3, 3 and of the prime strip 4 are securely fastened together and the unit thus formed is applied to the cable by any suitable means such as the clamp bars 5 and 6 with their clamping screws 7, so that the end portions of the strips 3, 3 and 4 and the cable portions 1 and 2 are firmly gripped thereby. The intermediate portion 8 of the cable is left slack and the tension between the portions 1 and 2 is assumed by the curved spring members 3, 3.

Figure 2:
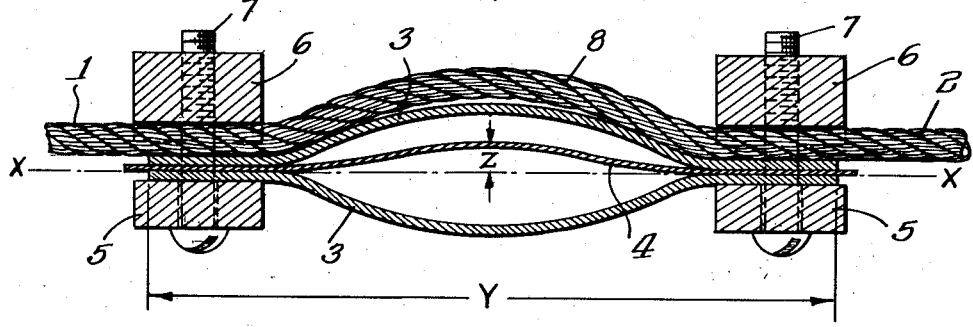
Fig. 2 is a longitudinal sectional view of the same, taken substantially at the vertical plane of the cable axis, but omitting the strain gauges.

Figures 1 and 2 show the parts as they appear with zero or minimum tension in the cable. As a load is applied the spring members 3, 3 will tend to straighten and their middle portions will deflect toward each other and toward the plane X—X. It is obvious that as the load is increased the dimension denoted by Y on Fig. 2 will increase; however, this increase will take place at a diminishing rate as the steel spring members 3, 3 approach a straight line. In other words, equal increments of tension will produce smaller and smaller increments in the dimension Y, and if the changes in Y were observed directly it would become more and more difficult to secure accurate readings as the loads were increased.

But the minor axis of the elliptical unit decreases as the major axis is elongated by increase of load, and from the geometrical relations of the parts it is evident that equal increments of Y will produce successively increasing increments of transverse deflection, as the curved members 3, 3 approach straight line form. Since equal increments of tension cause successively smaller increments in the dimension Y, it is apparent that equal increments in Y correspond to successively greater increments of load. But equal increments of Y cause successively greater increments in the transverse deflection of the curved members; and within reasonable limits the changes of load will therefore be accompanied by proportional changes in transverse deflection.

These changes in transverse deflection increase more rapidly as a curved member approaches a straight form. The prime strip 4 is secured at its ends to the end portions of the spring members 3, 3; hence any changes in the dimension Y for the prime strip 4 will be identical with simultaneous changes in the dimension Y for the spring members 3, 3. But the initial curvature of the prime strip 4 is less than that of the spring strips 3, 3, and its distance or deflection from the plane X—X, which is denoted in Figure 2 as Z, is at all times less than that of the spring members 3, 3. By reason of this lesser curvature of the strip 4, the changes in the dimension Z caused by equal increments of tensile load on the cable will not only be successively greater and greater, but these changes will increase more rapidly than the corresponding deflections of the spring members 3, 3. Accordingly, it is preferable to employ the prime strip 4 as the indicator of changes in load on the cable under observation. Then it becomes possible to calibrate the instrument to translate the changes in the dimension Z into terms of cable load or tension, and the result will be a scale on which equal increments of load will be represented by substantially equal spaces or on which the spaces may increase somewhat as the load increases, and which will therefore permit of taking accurate readings throughout the range for which the particular tensiometer has been designed.

Figure 3:
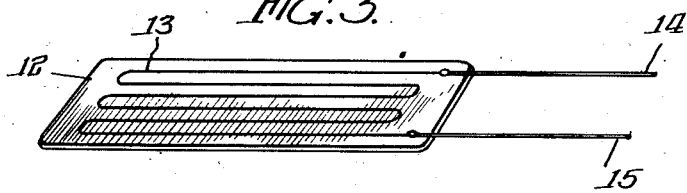
Fig. 3 is a detail perspective view of an electric strain gauge with one of its cover sheets removed.

Any convenient means for measuring the deflection, Z, of the prime strip 4 may be employed. The drawing shows this means as including a pair of electric strain gauges 10 and 11 secured respectively to the upper and lower faces of the prime strip 4 in any convenient manner which insures that they will partake of its changes of curvature. Each of these gauges consists of a small diameter resistance wire laid in sinuous form between and bonded between two layers of thin paper. Figure 3 shows such a device with one layer of the paper removed, disclosing the other layer of paper 12 with the resistance wire 13 disposed upon it and provided with terminal conductors 14 and 15. Changes in the form of the wire 13 cause slight changes in its resistance which can be measured and utilized to indicate changes in the surface dimensions of the prime strip 4 to which the strain gauges are intimately attached.

Figure 4:
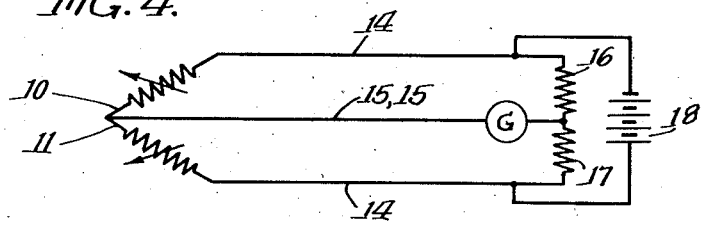
Fig. 4 is a wiring diagram for a circuit including the strain gauges and an indicating instrument.

Figure 4 shows a Wheatstone bridge type of circuit into which the strain gauges 10 and 11 are connected by means of their terminal conductor wires 14, 15 together with fixed resistors 16 and 17, an energizing battery 18 and a galvanometer or equivalent instrument G. Deflections of the prime strip 4 caused by changes of load in the cable will be reflected in the readings of the galvanometer as the resistances 10 and 11 are altered and thus modify the original balanced condition of the Wheatstone bridge circuit. The galvanometer may be graduated directly in terms of load or may be employed in conjunction with an appropriate table of values, but in either case its readings will be readily and accurately observable and will be substantially proportional to changes in the deflection Z and to the changes of load in the cable. Thus, for example, in testing the control cables with which an airplane is fitted, a plurality of tensiometer units may be applied to the several control cables of the plane, the conductors 14 and 15 being flexible and being made of any convenient length so as to permit locating the galvanometers G at some distance from the portions of the cables to which the units are applied. Usually the indicating apparatus will be set up in the cabin of the plane so that readings can be taken for determining the behavior of the various parts under actual flight conditions.

I claim as my invention:

1. A cable tensiometer which includes a curved, thin, flexible, metallic strip member, clamp means securing the end portions of said member to spaced parts of a cable under tension with its intermediate portion bowed away from the line of tension between said parts and with the intermediate portion of the cable slack, and means indicating the movements of said intermediate portion of the member toward and from said line of tension as the load on the cable is varied.

2. A cable tensiometer comprising, in combination, a curved metallic spring tension member, means securing its end portions to spaced parts of a cable under tension with the intermediate portion of the cable relieved of tension and with said tension member subjected to the strain on the cable, an indicator strip having less initial curvature than said tension member and having its ends secured respectively to the ends of the tension member, and means measuring the change in curvature of the intermediate portion of the said indicator strip independently of the alteration in the tension member as the load on the cable varies.

3. A cable tensiometer comprising, in combination, a curved metallic spring tension member, clamp means at each end of said member securing it to longitudinally spaced parts of a cable with the intermediate portion of the cable slack, a curved indicator actuating strip of thin flexible metal attached at its ends to said clamp means and extending from one clamp to the other, and means measuring the transverse movement of the mid-portion of said strip as the load on the cable varies.

4. A cable tensiometer comprising a pair of oppositely curved metallic spring members disposed in opposed relation with their ends together, a curved flexible indicator actuating strip extending between said opposed members with its end portions engaged with the end portions of said members, means securing the ends of said members and of said strip to spaced parts of a cable under tension with the intermediate part of the cable slack so that said spring members assume the tensile load on the cable, and means for indicating lateral movements of the mid-portion of said strip as the load on the cable varies.

5. A cable tensiometer which includes a curved member, means securing its end portions to spaced parts of a cable under tension with its intermediate portion bowed away from the line of tension between said parts and with the intermediate portion of the cable slack, a pair of electric strain gauges secured respectively to opposite faces of the curved member, a circuit in which said gauges are connected including a source of electrical energy, and means sensitive to changes in resistance of the gauges occasioned by changes in the curvature of the member as the load on the cable varies.

6. A cable tensiometer comprising, in combination, a curved metallic spring tension member, means securing its end portions to spaced parts of a cable under tension with the intermediate portion of the cable relieved of tension and with said tension member subjected to the strain on the cable, an indicator strip having less initial curvature than said tension member and having its ends secured respectively to the ends of the tension member, a pair of electric strain gauges secured respectively to opposite faces of the indicator strip, a circuit in which said gauges are connected including a source of electrical energy and means sensitive to changes in resistance of the gauges occasioned by changes in the curvature of the strip as the load on the cable varies.

7. A cable tensiometer comprising a pair of oppositely curved metallic spring members disposed in opposed relation with their ends together, a curved flexible indicator actuating strip extending between said opposed members with its end portions engaged with the end portions of said members, means securing the ends of said members and of said strip to spaced parts of a cable under tension with the intermediate part of the cable slack so that said spring members assume the tensile load on the cable, a pair of electric strain gauges secured respectively to opposite faces of the curved member, a circuit in which said gauges are connected including a source of electrical energy and means sensitive to changes in resistance of the gauges occasioned by changes in the curvature of the member as the load on the cable varies.

8. A cable tensiometer comprising a pair of oppositely curved metallic spring members disposed in opposed relation with their ends together, a curved flexible indicator actuating strip extending between said opposed members with its end portions engaged with the end portions of said members, clamp devices securing the end portions of said strip between the end portions of the spring members and also securing said end portions of the spring members to longitudinally spaced parts of a cable to be tested and with the intermediate part of the cable between said clamp devices relieved of tension, and means for measuring changes of curvature of the indicator actuating strip as the load on the cable varies.

9. A cable tensiometer which includes a curved member, means securing its end portions to spaced parts of a cable under tension with its intermediate portion bowed away from the line of tension between said parts and with the intermediate portion of the cable slack, a pair of electric strain gauges intimately attached respectively to opposite faces of the curved member, and a Wheatstone bridge circuit in which said gauges are included with a galvanometer responsive to changes in the curvature of said member as the load on the cable varies.

10. A cable tensiometer comprising a pair of oppositely curved metallic spring members disposed in opposed relation with their ends together, a curved flexible indicator actuating strip extending between said opposed members with its end portions engaged with the end portions of said members, means securing the ends of said members and of said strip to spaced parts of a cable under tension with the intermediate part of the cable slack so that said spring members assume the tensile load on the cable, a pair of electric strain gauges intimately attached respectively to opposite faces of the indicator strip, and a Wheatstone bridge circuit in which said gauges are included with a galvanometer responsive to changes in the curvature of said strip as the load on the cable varies.

11. A cable tensiometer which includes a curved, thin, flexible, metallic strip, means securing the end portions of said strip to spaced parts of a cable under tension with its intermediate portion bowed away from the line of tension between said parts and with the intermediate portion of the cable slack, and means applied flat to said strip and extending longitudinally thereof to partake of the change of curvature thereof under varying load for indicating the movements of said intermediate portion of said strip toward and from said line of tension as the load on the cable is varied.

12. A cable tensiometer which includes a curved member, means securing its end portions to spaced parts of a cable under tension with its intermediate portion bowed away from the line of tension between said parts and with the intermediate portion of the cable slack, a pair of electric strain gauges secured respectively to opposite faces of the curved member, and a circuit in which said gauges are connected including a source of electrical energy.

13. A cable tensiometer which includes a curved member, means securing its end portions to spaced parts of a cable under tension with its intermediate portion bowed away from the line of tension between said parts and with the intermediate portion of the cable slack, and means extending longitudinally of said member and applied intimately thereto to partake of the change of curvature thereof under varying load for indicating movements of said intermediate portion of the member toward and from the line of tension as the load on the cable varies.

HARVEY D. GIFFEN.